US012768994B2

(12) United States Patent
Schlosser et al.

(10) Patent No.: US 12,768,994 B2

(45) Date of Patent: Oct. 20, 2026

(54) TRIANGULATION DEVICE HAVING AN ELONGATE FRAME FOR OBJECT TRACKING, TRIANGULATION, AND SIZE APPROXIMATION

(71) Applicant: Banner Engineering Corp., Minneapolis, MN (US)

(72) Inventors: Robert Earl Schlosser, Eden Prairie, MN (US); Arthur Guy Padget, Maplewood, MN (US)

(73) Assignee: Banner Engineering Corp., Minneapolis, MN (US)

( * ) Notice: Subject to any disclaimer, the term of this patent is extended or adjusted under 35 U.S.C. 154(b) by 457 days.

(21) Appl. No.: 17/856,473

(22) Filed: Jul. 1, 2022

(65) Prior Publication Data

US 2023/0003885 A1 Jan. 5, 2023

Related U.S. Application Data

(60) Provisional application No. 63/217,845, filed on Jul. 2, 2021.

(51) Int. Cl.

*G01S 17/48* (2006.01)
*G01B 11/14* (2006.01)

(Continued)

(52) U.S. Cl.

CPC .............. *G01S 17/48* (2013.01); *G01B 11/14* (2013.01); *G01S 7/4815* (2013.01); *G01S 7/4972* (2013.01); *G06Q 10/08* (2013.01)

(58) Field of Classification Search

CPC ...... G01S 17/48; G01S 7/4815; G01S 7/4972; G06Q 10/08

See application file for complete search history.

(56) References Cited

U.S. PATENT DOCUMENTS 6,466,305 B1 * 10/2002 McBain ............... G01B 11/024 356/3.08
7,077,318 B2 * 7/2006 Venema ............... G06Q 10/087 235/383

(Continued)

FOREIGN PATENT DOCUMENTS

CA 3140256 12/2020
CN 209265502 U 8/2019

(Continued)

OTHER PUBLICATIONS

International Patent Application No. PCT/US2022/035987, filed Jul. 1, 2022, International Search Report and Written Opinion mailed on Oct. 18, 2022, 13 pages.

*Primary Examiner* — Tarifur R Chowdhury
*Assistant Examiner* — Joshua M Carlson
(74) *Attorney, Agent, or Firm* — Mueting Raasch Group

(57) ABSTRACT

The current technology relates to a device for performing location triangulation on an object of interest. The device can include an elongate frame defining a sensor plane. The device can further include distance sensors equally spaced and fixed to the elongate frame. A distance sensor can sense an object distance outwardly from the sensor plane. The device can further include a processor coupled to the distance sensors and configured to triangulate a location of a first object outwardly from the sensor plane based on the object distance sensed by the plurality of distance sensors. Other example systems and methods are also described.

9 Claims, 6 Drawing Sheets

(51) Int. Cl.

| | |
|---|---|
| ***G01S 7/481*** | (2006.01) |
| ***G01S 7/497*** | (2006.01) |
| ***G06Q 10/08*** | (2024.01) |

(56) References Cited

U.S. PATENT DOCUMENTS

| | | | | |
|---|---|---|---|---|
| 9,171,278 | B1 | 10/2015 | Kong et al. | |
| 10,831,431 | B2 | 11/2020 | Nel | |
| 11,057,590 | B2 * | 7/2021 | Seiger | H04N 23/56 |
| 2009/0268029 | A1 * | 10/2009 | Haussmann | F16P 3/14<br>348/E7.085 |
| 2012/0062725 | A1 | 3/2012 | Wampler, II et al. | |
| 2014/0110584 | A1 * | 4/2014 | Campbell | G01J 1/42<br>250/340 |
| 2015/0184997 | A1 * | 7/2015 | Campbell | G01J 3/50<br>250/349 |
| 2020/0394603 | A1 | 12/2020 | Ottitsch et al. | |
| 2021/0112647 | A1 * | 4/2021 | Coleman | H05B 45/12 |
| 2021/0165098 | A1 * | 6/2021 | Kimura | G01S 17/89 |

FOREIGN PATENT DOCUMENTS

| | | | |
|---|---|---|---|
| EP | 2673592 | B1 | 3/2019 |
| EP | 3441797 | B1 | 4/2020 |
| EP | 3136314 | B1 | 8/2020 |
| JP | 2005029391 | | 2/2005 |
| JP | 2007328668 | | 12/2007 |
| JP | 5104468 | | 12/2012 |
| WO | 2022159921 | | 7/2022 |

* cited by examiner

TRIANGULATION DEVICE HAVING AN ELONGATE FRAME FOR OBJECT TRACKING, TRIANGULATION, AND SIZE APPROXIMATION

This application claims the benefit of U.S. Provisional Application No. 63/217,845, filed Jul. 2, 2021, the disclosure of which is incorporated by reference herein in its entirety.

TECHNOLOGICAL FIELD

The present disclosure is generally related to a triangulation of a position. More particularly, the present disclosure is related to a system for triangulating a location from which an object has been lifted based on triangulation.

BACKGROUND

Product distributors and manufacturers maintain inventories of products and parts. These products and parts are typically stored in receptacles, for example bins, until the products or parts are needed in the distribution or manufacturing process. Items of several different types can each be stored in different bins within a single storage area, and operators can pick items as needed from these different bins. However, selecting the correct bin to pick from can be a time-consuming and error-prone process. Current methods used for picking items from inventory utilize a one-sensor-per-bin approach. This approach is economical when the bin configuration does not change but is less useful in dynamic manufacturing and product fulfillment environments. More complex methods can utilize a motorized scanner or a two-piece grid array. However, these approaches may add considerable complexity and cost in the infrastructure necessary to install, align, service, reconfigure and maintain such systems.

SUMMARY

Devices consistent with the technology disclosed herein include a sensor device. The sensor device has an elongate frame and a plurality of distance sensors equally spaced and fixed to the elongate frame. The plurality of distance sensors each have a sensor face. The sensor faces cumulatively define a sensor plane. Each of the plurality of distance sensors is configured to sense an object distance outwardly from the sensor plane. A processor is in data communication with each of the plurality of distance sensors. The processor is configured to triangulate a location of an object outwardly from the sensor plane.

In some such embodiments, the device has a notification device, where the processor is in operative communication with the notification device. In some of those embodiments, the notification device has a plurality of illumination elements arranged along the elongate frame. Each of the plurality of illumination elements are configured to selectively illuminate a beam of light outwardly from the frame. The processor is configured to selectively illuminate an individual illumination element of the plurality of illumination elements. In some such embodiments, each of the plurality of illumination elements has a multi-color light emitting diode. Additionally or alternatively, each of the plurality of illumination elements comprises a plurality of light emitting diodes. In some such embodiments, each of the plurality of illumination elements has a light emitting diode having a first color and a light emitting diode having a second color.

Additionally or alternatively, the device has a releasable electrical interface towards a first elongate end of the sensor device and a mating electrical interface towards an opposite elongate end of the sensor device. The releasable electrical interface and the mating electrical interface have structures capable of mating. Additionally or alternatively, the processor is configured to approximate a two-dimensional area of the object in an object plane parallel to the sensor plane. Additionally or alternatively, the processor is configured to compare the approximate two-dimensional area to an expected two-dimensional area and generate an error signal when the approximated two-dimensional area does not match the expected two-dimensional area of the object.

Some embodiments of the technology disclosed herein relates to a bin pick device. The bin pick device has an elongate frame configured to extend along a plurality of columns of bin openings. A plurality of illumination elements are arranged along the elongate frame, where each illumination element is configured to selectively illuminate a beam of light outwardly from the elongate frame. The beam of light is configured to align with a column of bin openings of the plurality of columns of bin openings. A bin identifier is configured to identify a target bin opening within the column of bin openings. The bin identifier is in operative communication with the plurality of illumination elements. The device has a triangulation assembly coupled to the elongate frame. The triangulation assembly is configured to identify a location of an object adjacent the plurality of columns of bin openings. A processor is configured to compare the identified object location to the target bin opening. A notification device is in communication with the processor. The notification device is configured to provide an error signal when the identified object location does not match the target bin opening.

In some such embodiments, the triangulation assembly has a plurality of distance sensors arranged in an array along the elongate frame and each of the distance sensors are configured to sense an object distance outwardly from a sensor plane defined by the sensors. Additionally or alternatively, the error signal is an audio signal. Additionally or alternatively, the error signal is an optical signal. Additionally or alternatively, the triangulation assembly is configured to approximate a size of the object. In some such embodiments, when the approximate size of the object is within a particular range, the processor is further configured to compare the approximate size of the object to an expected size of the object. The notification device is further configured to provide an error signal when the approximate object size does not match the expected size of the object.

Additionally or alternatively, each illumination element of the plurality of illumination elements defines a plurality of colors, and the bin identifier correlates each color of each illumination element with one bin opening of a plurality of rows of bin openings. Additionally or alternatively, the bin identifier has a speaker coupled to the elongate frame, where the speaker is configured to emit an audio signal identifying a target bin opening.

Yet other embodiments of the technology disclosed herein relate to a method. A first target bin opening is identified among a plurality of bin openings that are arranged in a plurality of columns of bin openings. The first target bin opening is identified by identifying a first column of bin openings of the plurality of columns of bin openings by selectively illuminating a first beam of light towards the first column of bin openings and identifying the first target bin opening within the first column of bin openings. Subsequent to identifying the first target bin opening, a location of a first object adjacent the plurality of bin openings is triangulated. The triangulated location of the first object is compared to the first target bin opening. An error signal is provided when the triangulated location of the first object does not match the first target bin opening.

In some such embodiments, the first beam of light is illuminated by illuminating a first illumination element of a plurality of illumination elements arranged across an elongate frame. Additionally or alternatively, each illumination element of the plurality of illumination elements is configured to selectively illuminate a beam of light outwardly from a sensor plane defined by the sensors. Additionally or alternatively, the first target bin opening is identified by identifying a first row of bin openings of a plurality of rows of bin openings.

Additionally or alternatively, the method further includes identifying a second target bin opening of the plurality of bin openings, which includes identifying a second column of bin openings of the plurality of columns of bin openings by selectively illuminating a second beam of light towards the second column of bin openings and identifying the second target bin opening within the second column of bin openings. After identifying the second target bin opening, a location of a second object adjacent the plurality of bin openings is triangulated. The triangulated location of the second object is compared to the second target bin opening. An error signal is provided when the triangulated location of the second object does not match the second target bin opening.

Additionally or alternatively, identifying the second target bin opening comprises identifying a second row of bin openings of a plurality of rows of bin openings. Additionally or alternatively, identifying the second target bin opening occurs when the identified first object location matches the first target bin opening.

The above summary is not intended to describe each embodiment or every implementation. Rather, a more complete understanding of illustrative embodiments will become apparent and appreciated by reference to the following Detailed Description and claims in view of the accompanying figures of the drawing.

The present technology may be more completely understood and appreciated in consideration of the following detailed description of various embodiments in connection with the accompanying drawings.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way.

DETAILED DESCRIPTION

This disclosure describes a device to sense positions of objects. In some embodiments, the device can sense the position of objects adjacent openings of various bins in the moment when each object is removed from its respective bin and is located adjacent to the opening of its respective bin. Such bin systems can be used, for example, on a manufacturing floor when providing parts for various processes, or in an order fulfillment system such as can be used in a warehouse. However, embodiments are not limited to object detection adjacent to the openings of bins.

The technology disclosed herein relates to a sensor array that employs triangulation to monitor objects in a particular region. Using triangulation to detect and locate objects in the context of a bin pick system advantageously may allow a single sensor device to be used to monitor an entire array of bins. This is differentiated from some existing systems where multiple sensor devices need to be installed in the system, either where each bin is monitored individually by a separately mounted sensor or where two sensor arrays need be installed in a complementary fashion (either perpendicularly or in parallel, such as laser sensors) to monitor the array of bins. The sensor device 115 described herein is advantageously reconfigurable to accommodate numerous variations in the design of the system within which it will be installed. Accordingly, sensor devices 115 can advantageously be deployed, configured, and reconfigured quickly and efficiently. In various embodiments, the need for physical reconfiguration, remounting, and/or rewiring of indicators and/or sensor can be reduced or eliminated.

Figure 1:
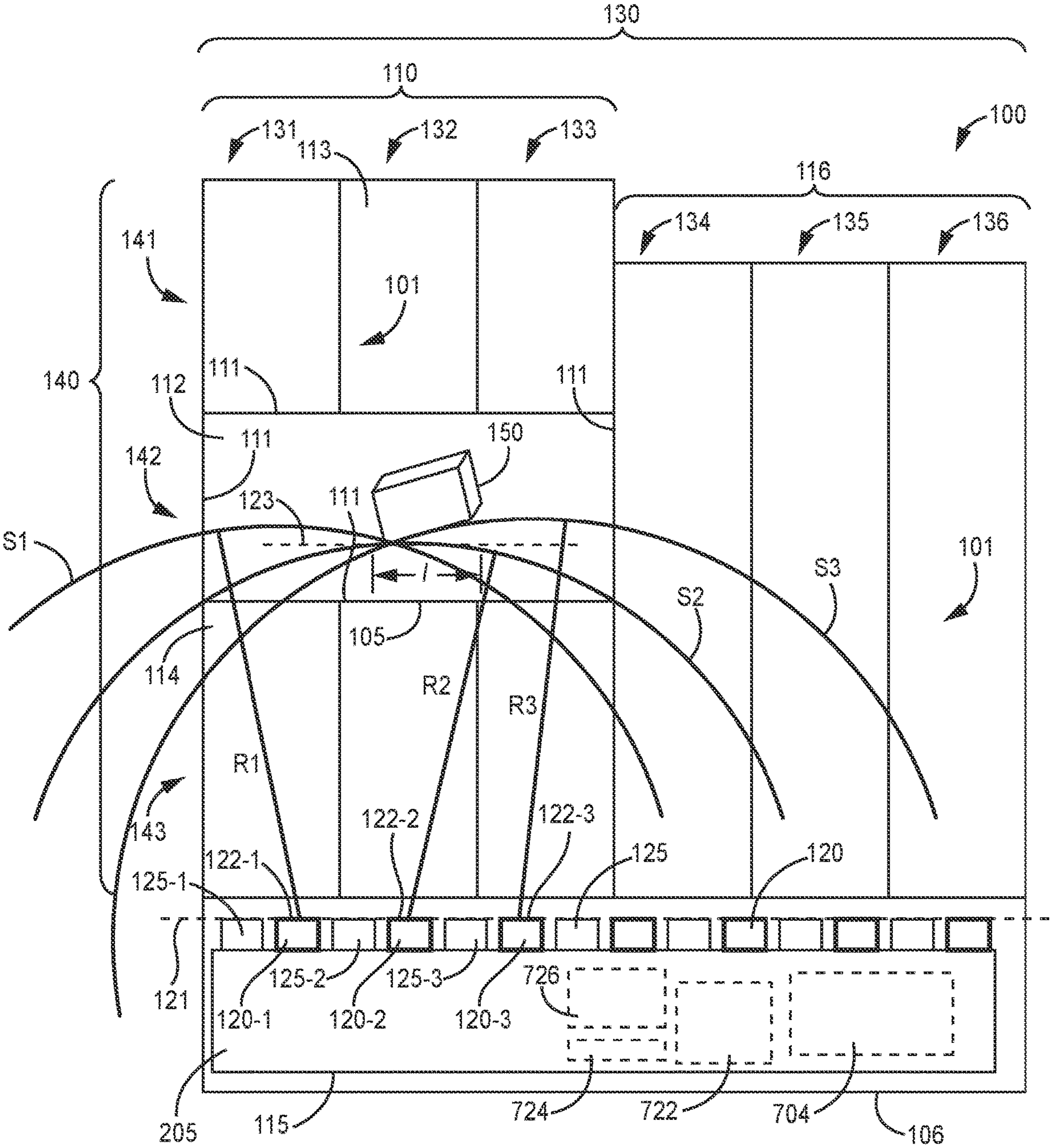
FIG. 1 depicts a facing view of a schematic exemplary distance sensing and visual indication system in which example embodiments can be implemented.
Figure 2:
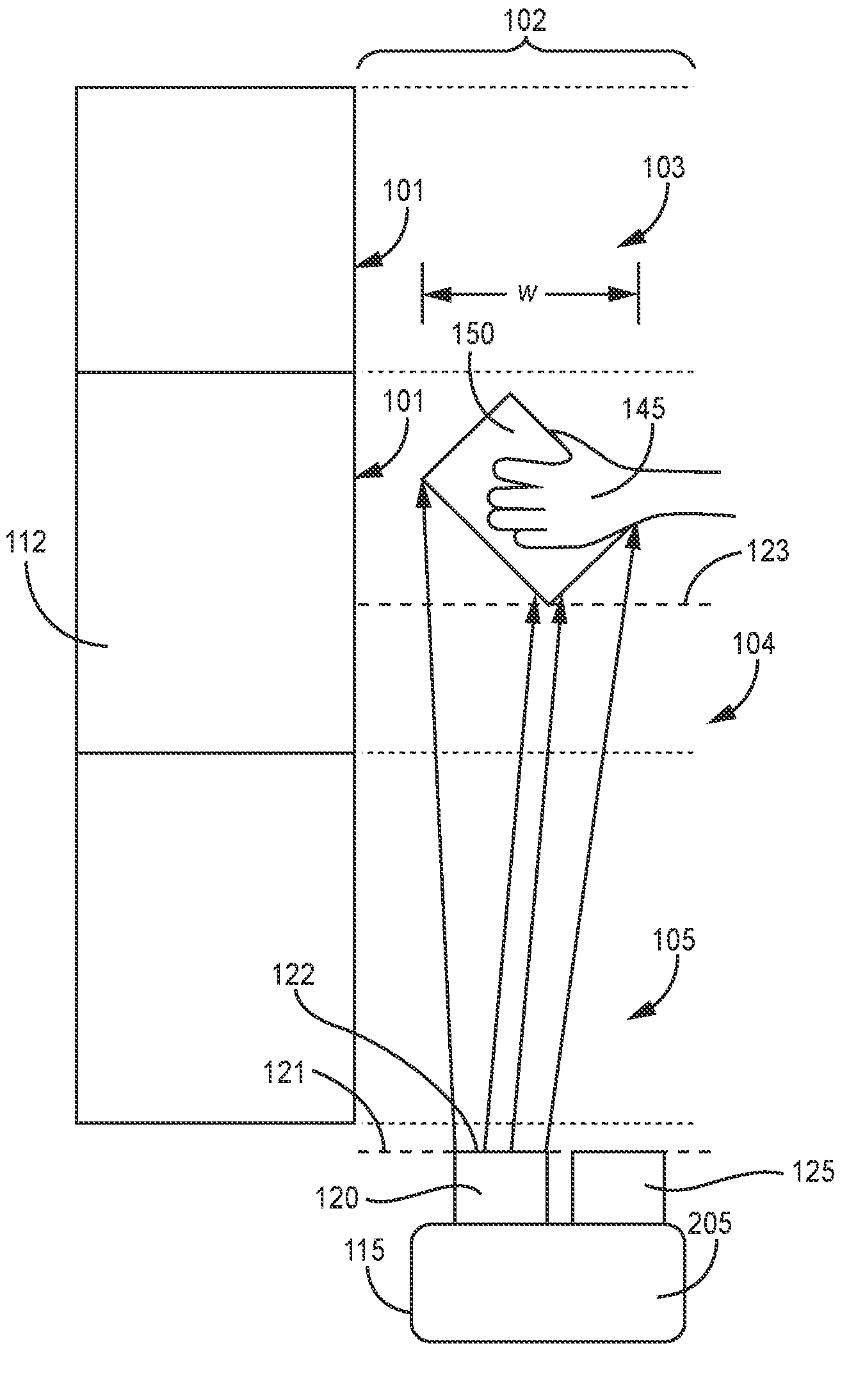
FIG. 2 depicts an example schematic side view consistent with the system of FIG. 1.

FIG. 1 depicts a facing view of a schematic distance sensing and visual indication system 100 in which example embodiments can be implemented, and FIG. 2 is a side schematic view of the system of FIG. 1. The example system 100 is consistent with a pick-to-light (or put-to-light) system. The system has a plurality of bins at least arranged in a plurality of columns of bins 130, where "columns" is defined herein to encompass general alignment in either the vertical direction or the horizontal direction (although in the current figure, the plurality of columns of bin openings 130 are arranged vertically, and "the plurality of columns of bin openings" is also denoted by element number 130). Correspondingly, "rows," is defined herein as general alignment in the direction perpendicular to the columns, whether in the horizontal direction or the vertical direction.

In the current example, the plurality of columns of bins 130 include six columns of bins 131, 132, 133, 134, 135, 136. In each of the fourth 134, fifth 135 and sixth 136 columns of bins each have a single bin, but in various other embodiments each of those columns can have multiple bins.

In some embodiments, the plurality of bins 101 are not necessarily arranged in rows, but in some other embodiments, such as the example depicted, the plurality of bins 101 are arranged in a plurality of rows 140. The plurality of bins 101 can have various specific configurations, but in this specific example, a first plurality of bins 110 form a first row of bins 141. A second bin 112 (which could alternately be a second plurality of bins) form a second row of bins 142. A third plurality of bins 114 form a third row of bins 143. A fourth plurality of bins 116 are larger than at least the first plurality of bins 110 and third plurality of bins 114, and each bin of the fourth plurality of bins 116 forms a column that extends across at least a portion of each of the first row of bins 141, the second row of bins 142, and the third row of bins 143.

Each of the bins defines a bin opening 101 (not visible in FIG. 2, but FIG. 1 provides a facing view of each of the bin openings, and "the plurality of bins" is also denoted by element number 101) through which an object can pass through (such as during placement or removal of the object into or from the bin). As such, the bin openings 101 have the same arrangement as the bins such that the bin openings 101 are arranged in a plurality of columns and, in the current example, also arranged in a plurality of rows. Each of the bins can store a particular object for retrieval. In some implementations, each of the bins stores a different object that is configured to be removed for assembly of objects forming a kit, a product order, or the like.

The term "bin" as used herein is defined as a delineated area that is configured to store one or more objects. The term "bin" includes a shelf, drum, box, and the like. While in some embodiments each bin is a discrete area separated from one or more adjacent bins by a physical structure such as a sidewall, in some other embodiments a bin is a discrete area separated from one or more adjacent bins by a void space rather than a physical structure such as a sidewall. In the current example however, each bin, such as the second bin 112, has at least one sidewall 111 and, in particular, four sidewalls (also denoted as 111) that define the delineated area of the second bin 112 and the bin opening 101. Three of the four sidewalls 111 create a physical barrier between the example second bin 112 and adjacent bins, and one of the four sidewalls 111 creates a physical barrier between the example second bin 112 and the environment outside of the bin system.

To remove an object 150 from its respective bin, such as the second bin 112 as currently depicted, a user reaches into the second bin 112 with one or two hands (visible in FIG. 2) and removes the object 150. As the object 150 is being removed from its second bin 112, there is a period of time (which may be relatively brief) when the object 150 is outside of the bin, within a region 102 adjacent to the bin opening 101 (FIG. 2). The system 100 disclosed herein is generally configured to detect the position of the object in the region 102 adjacent the bin openings of the plurality of bins 101 to confirm that the correct object was removed from the correct bin. In particular, the system 100 compares the position of the object 150 in the region 102 adjacent the bins to the location of each of the bins to correlate the position of the object 150 with a particular bin. In some embodiments the system 100 may also incorporate a notification device, which will be described in more detail herein.

The system 100 has a sensor device 115. The sensor device 115 is generally configured to sense the presence and location of an object that has just been removed from a bin or, alternatively, is being inserted into a bin. More particularly, the sensor device 115 is configured to sense the presence and location of an object 150 that is in the region 102 adjacent the plurality of columns of bins 130 and, therefore, a corresponding plurality of columns of bin openings. Such a positioning of an object 150 generally suggests that the object 150 is either being inserted or removed from the bin. In various embodiments, the sensor device 115 is configured to use triangulation to identify the location of an object 150. The region 102 adjacent the plurality of columns of bin openings 130 is the region that abuts each of the bin openings 101.

The sensor device 115 has an elongate frame 205 that extends along the plurality of columns of bins 130 (and, therefore the corresponding plurality of columns of bin openings 130). A triangulation assembly is coupled to the elongate frame 205. The triangulation assembly is configured to identify a location of an object adjacent the plurality of bin openings 101. Such a configuration allows the sensor device 115 to identify the bin from which—and the bin opening through which—the object 150 was removed.

The triangulation assembly can have a plurality of distance sensors 120 each configured to sense a distance from an object 150 in the region 102 adjacent the plurality of columns of bin openings 130. Each distance sensor 120 is generally configured to emit signals and detect reflection thereof. The distance sensors 120 are fixed to an elongate frame 205. In various embodiments, the distance sensors 120 can be equally spaced along the elongate frame 205. The distance sensors 120 are each configured to sense an object distance outwardly from a sensor plane 121, which is an imaginary plane cumulatively defined by the sensor faces 122 of each of the sensors 120 coupled to the elongate frame 205. A sensor face 122 is the region of each sensor 120 that is configured to facilitate signal transmission between the outside environment and the sensor circuitry. The distance sensors 120 may, by way of example and not limitation, include time of flight (e.g., laser) sensing, photoelectric sensing, capacitive touch sensing, ultrasonic sensing, or some combination thereof.

In use, a user reaches their hand 145 (see FIG. 2) into one of the bins, for example, the second bin 112, and grabs the object 150 and pulls it in a generally horizontal direction (relative to FIG. 2) out of the bin. The user's hand 145 causes signals emitted by distance sensors 120 to be at least partially reflected. Additionally, the object 150 can cause the signals emitted by distance sensors 120 to be at least partially reflected. Resulting reflected signals are received by the distance sensors 120. The distance sensors 120 use the received signals to determine the object distance outwardly from the sensor plane 121. A processor 704 is in data communication with each of the plurality of distance sensors 120. The processor 704 is configured to triangulate the specific location of the object 150 and/or the user's hand 145 in the region 102 adjacent the bin opening 101 based on the distance sensed by each of the plurality of distance sensors 120.

In various embodiments, the processor 704 can be configured to execute a confirmation step. For example, the processor can be configured to compare the triangulated object location to a target bin opening. The target bin opening can be identified by the system as the bin from which the user should have picked the object.

More particularly, and with specific reference to FIG. 1, each of the distance sensors 120 is configured to determine a distance of the object from the sensor 120-1, 120-2, 120-3 that corresponds to a radius R1, R2, and R3 of a spherical sector S1, S2, and S3 (respectively) around the particular sensor face 122-1, 122-2, 122-3. In some examples, the distances R1, R2 and R3 are determined based on time of flight of the sensing signal that is transmitted out and reflected back to respective sensors 120-1, 120-2 and 120-3, although embodiments are not limited thereto. The processor 704 receives the distance data from each of the sensors 120 and triangulates the location of the object 150 outwardly from the sensor plane 121. The processor 704 is configured to triangulate the location of the object 150 within the region 102 adjacent the bin openings relative to the plurality of columns of bin openings 130. Based on the location of the object 150 relative to the plurality of columns of bin openings 130, the processor 704 is configured to identify the particular bin opening 101 and, therefore, the particular bin, from which the object 150 was removed.

It is noted that, while three distance sensors 120-1, 120-2 and 120-3 are explicitly referenced in the discussion in the paragraph above, the distance calculations and location triangulation can use any number of distance sensors and further can include other circuitry and elements.

As mentioned above, the processor 704 can be configured to compare the object location to the location of a target bin opening to confirm that the correct bin (the "target bin") was accessed. In various embodiments, the processor 704 is configured to cause generation of an alert if an incorrect bin was accessed. A "target bin opening" is generally defined herein as the intended bin opening that a user was to access for the present picking operation. The region 102 (FIG. 2) adjacent the plurality of columns of bin openings 130 (FIG. 1) is divided into sub-regions 103, 104, 105 (FIG. 2) that each abut and laterally align with a particular bin opening 101 of the plurality of columns of bin openings 130. Each sub-region 103, 104, 105 represents the region within which an object 150 would be located upon having just been removed from (or immediately prior to being inserted into) a particular bin of the plurality of columns of bins 130. The location of each sub-region 103, 104, 105 is defined a particular range of distances from each of the distance sensors 120, which is stored in memory (not currently depicted, but described below with reference to FIG. 7) that is in communication with the processor 704. The processor 704 is configured to compare the triangulated object location to the location of each of the sub-regions to identify the particular sub-region 103, 104, 105 within which the object 150 is located.

In the example of FIGS. 1 and 2, the processor 704 compares the triangulated object 150 location to the location of each of the sub-regions 103, 104, 105. Because the triangulated object location is within the boundaries of a second sub-region 104, the second bin 112 (particularly visible in FIG. 1) is identified as the particular bin the object 150 was either removed from or inserted into. The processor 704 can be further configured to compare the particular bin to the target bin as a confirmation step and generate notification of confirmation or an error signal when the particular bin is not the target bin.

In some embodiments, the system has a bin identifier 722 (FIG. 1) that is configured to identify the target bin opening through which the object should be removed for proper assembly of the order, kit, or the like. It is contemplated that a similar identification scheme may be utilized for proper placement of an object intended to be placed into (rather than removed from) a target bin. In some embodiments the bin identifier 722 is configured to receive data identifying the target bin from an external system, for example. In some embodiments, the processor 704 is in data communication with a bin identifier 722 (or another internal or external system or component) to receive the target bin data.

The bin identifier 722 can also be configured to communicate the target bin to system users engaging in a bin pick operation. In various embodiments, the sensor device 115 has a plurality of illumination elements 125 arranged along the elongate frame 205. Generally, the illumination elements 125 are configured to selectively illuminate a beam of light outwardly from the elongate frame 205. In various embodiments, the illumination elements 125 are configured to selectively illuminate a beam of light outwardly from the sensor plane 121. The illumination elements 125 can be organized in an array, in some embodiments.

The bin identifier 722 is in operative communication with each of the illumination elements 125. The bin identifier 722 is configured to selectively illuminate an individual illumination element 125 of the plurality of illumination elements 125. In various implementations, the bin identifier 722 is configured to illuminate the individual illumination element 125 that generates a beam of light that aligns with the column of bins containing the target bin opening identified by the bin identifier 722, from which the object 150 should be removed (or inserted). Such a configuration provides visual indication to a user of the particular column of bins that contains the target bin from which the next object 150 will be retrieved.

It should be noted that the sensor device 115 may be programmed to illuminate the individual illumination elements 125 that best align, rather than perfectly align, with a particular column of bins openings 130. Furthermore, in some implementations, multiple illumination elements 125 may generate a beam of light that aligns with a particular column of bin openings 130, or where the target bin extends across multiple columns, such as the second bin 112. Even further, in some implementations, one or more individual illumination elements 125 may not sufficiently align with any particular column of bins openings 130.

For example, the third illumination element 125-3 of the plurality of illumination elements is positioned at a border between the second column of bin openings 132 and the third column of bin openings 133 and thus the third illumination element 125-3 may be omitted from programming that would result in using the third illumination element 125-3 to identify a particular column of bin openings 130 from the plurality of bin openings 101. In such an example, the third illumination element 125-3 can be programmed to be a component of a notification device, where the notification device will be described in more detail below.

The illumination elements 125 can have a variety of different configurations. In some embodiments, each illumination element 125 of the plurality of illumination elements is a single light emitting diode (LED), for example. In some other embodiments, each illumination element 125 of the plurality of illumination elements can include multiple sub-elements. For example, each illumination element 125 can be a grouping of a plurality of LEDs. In some such embodiments, each LED is a different color. For example, each of the plurality of illumination elements can have a first light emitting diode having a first color and a second light emitting diode having a second color. In some embodiments, each of the plurality of illumination elements comprises a multi-color light emitting diode. While LEDs are specifically referenced herein, the illumination elements 125 can also include other types of illumination elements such as lasers, liquid-crystal displays, e-ink displays, and the like.

The sensor device 115 is also configured to provide a user notification of the target bin within the particular column of bins that has been identified. Where the bins are arranged in rows, such as in the current example, the bin identifier 722 can be configured to provide an audio indication of the particular row, such as by number, relative location (for example, top, middle, and bottom), or the like. In such an example, the sensor device 115 can have a speaker 724 (FIG. 1) and/or a display (not currently depicted) with relevant circuitry that is operative by the bin identifier 722.

Additionally or alternatively, the bin identifier 722 can be programmed to correlate each color of each illumination element 125 with a particular row of bin openings. In such embodiments, the bin identifier 722 is configured to selectively illuminate the individual illumination element 125 aligning with the particular column of bin openings in the color correlating to the particular row that the target bin is within.

For example, the first row of bin openings 141 is correlated with the color red, the second row 142 is correlated with the color blue, and the third row is correlated with the color yellow. In such an example, if the particular identified bin is third bin 113, the bin identifier 722 is configured to illuminate the second illumination element 125-2 in the color red. The red illumination indicates to a user that the bin is the top row of bins 141 and the beam of light emanating from the second illumination element 125-2 aligns with column 2. If the target bin is the second bin 112, then the bin identifier 722 can be configured to illuminate the first illumination element 125-1, the second illumination element 125-2, and the third illumination element 125-3, each in the color blue. However, it will be appreciated that a variety of other indicator schemes can be implemented.

In some other embodiments, where the plurality of bins 101 are not arranged in rows, the bin identifier 722 can identify a target bin opening within the particular column of bin openings through an approach that is consistent with the particular system configuration. In some examples, the bins can be constructed to each reflect a different color within each column and, similarly to that described above, the bin identifier 722 can illuminate the relevant illumination element in the relevant color to identify the target bin within the particular column by color. As another example, the bins can be numbered within a particular column, and an audio or visual cue can be provided to the user to identify the target bin within the particular column. In some embodiments, upon confirmation by the processor 704 that the object location matches the target bin, illumination by the illumination elements 125 can be terminated until the bin identifier 722 identifies the next bin opening of the plurality of bin openings for the next picking operation.

In various embodiments, the sensor device 115 has a notification device 726 that is configured to provide an error signal to a user if there is a potential error in the bin pick operation. When the processor compares the identified object location to the target bin, and the identified object location and the target bin do not match (because the object location is inconsistent with an object having been removed from the target bin), the notification device 726 (FIG. 1) is configured to provide an error signal. Error signals can include commands to generate audio and/or visual alarms, notifications to remote or local devices, notifications to logging devices or databases, etc. In some embodiments the notification device is also configured to generate a user notification upon confirmation of a correct bin pick operation.

The notification device 726 is generally in data communication with the processor 704. The notification device is in operative communication with the plurality of illumination elements 125 in various embodiments. In such embodiments the notification device 726 can be configured to illuminate a light to notify a user of an error. In various embodiments the notification device 726 is in operative communication with a speaker 724 and/or a display screen that can also be used to provide a user notification.

In some embodiments, the sensor device 115 is also configured to approximate the size of the identified object 150 that has been removed from the bin in the picking operation, which can also be used by the processor 704 for confirmation purposes. In particular, the processor 704 can be configured to receive data reflecting the size of the object that is expected to be removed from the target bin. When the object 150 is removed from the bin opening 101 and is in the region 102 adjacent the bin opening 101, the distance sensors 120 can be configured to sense the approximate length l and width w of the profile of the object 150 in an object plane 123. The object plane 123 is a plane intersecting the object 150 that is parallel to the sensor plane 121.

Figure 3:
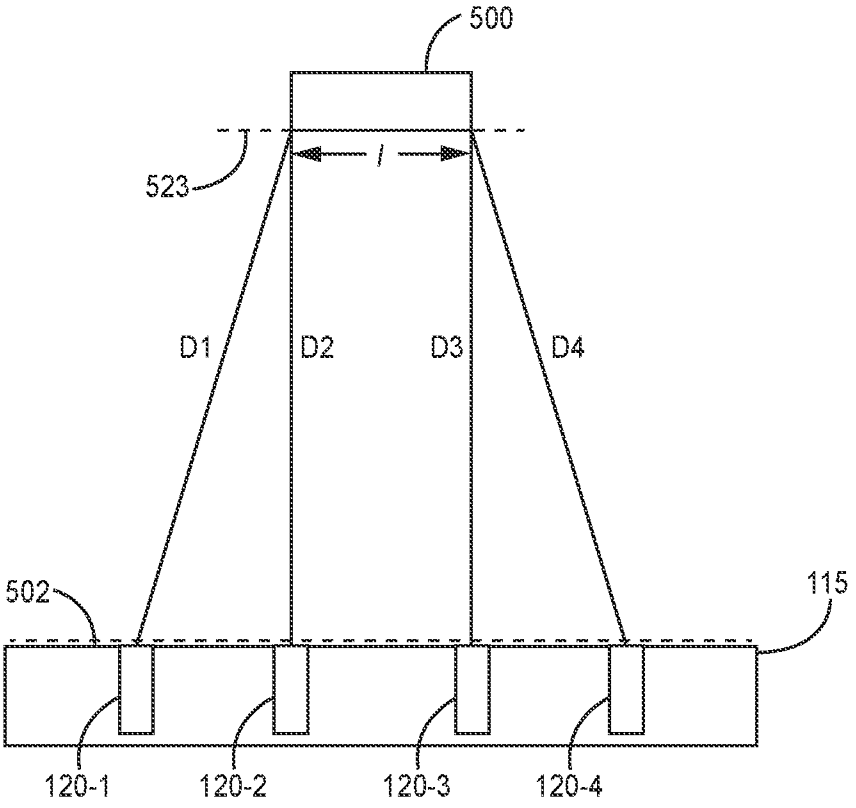
FIG. 3 illustrates approximation of a size of an object of interest in accordance with example embodiments.

FIG. 3 schematically illustrates approximation of a size of an object 500 of interest in accordance with example embodiments. Approximation of the size of the object 500 can be performed by the processor 704 (FIG. 1) of the sensor device 115. In examples, the object 500 can include a user's hand, the user's hand holding an object selected from a target bin (FIG. 1), or an unknown object. The processor 704 can approximate the size of the object 500 (and the location of the object, as described above) to confirm, for example, that a user has reached their hand into a target bin or to confirm the identity of the object 500 matches the size of objects expected to be stored in the target bin.

Sensor device 115 includes at least distance sensors 120-1, 120-2, 120-3, and 120-4 coupled to a frame and defining a sensor plane 502, which can be consistent with the discussion of the sensor plane 121 of FIGS. 1-2. While four distance sensors 120-1, 120-2, 120-3 and 120-4 are shown, the sensor device 115 can include any number of distance sensors and further can include other circuitry and elements. The sensor device 115 is configured to detect the object 500 adjacent to the plurality of bin openings (not currently depicted). The object 500 will have a length l and a width (not visible in FIG. 3) defining an object plane 523 parallel to the sensor plane 502. The processor 704 can approximate a two-dimensional area of the object 500 across the object plane 523.

It is noted that the object 500 adjacent to the bin openings generally will not form a planar surface that is parallel to the sensor plane 502. In some embodiments, the two-dimensional area of the object 500 across the object plane 523 can be the area of the profile of the object 500 projected in the object plane 523.

The processor can determine the two-dimensional area of the object 500 using trigonometric ratios and arithmetic calculations based on distances reported by the sensors 120-1, 120-2, 120-3 and 120-4. Sensor 120-1 emits a signal and receives reflections from which the sensor 120-1 can determine at least a distance D1-1 to one edge of the object 500 and a distance D1-2 to another edge of the object 500. Other distances to other edges can also be detected. Similarly, sensor 120-2 emits a signal and receives reflections from which the sensor 120-2 can determine at least the distances D2-1 and D2-2 to edges of the object 500. Sensor 120-3 emits a signal and receives reflections from which the sensor 120-3 can determine at least the distances D3-1 and D3-2 to at least two between sensor 120-3 and the object 500. Sensor 120-4 emits a signal and receives reflections from which sensor 120-4 can determine at least the distances D4-1 and D4-2 at least two edges of the object 500.

The processor can be configured to calculate an approximate two-dimensional area of the object 500 based further on trigonometric calculations and the distance measurements of the profile of the object 500 in the object plane 523. The processor can be configured to compare the approximate two-dimensional area to an expected two-dimensional area. The notification device is configured to generate an error signal when the approximated two-dimensional area does not match the expected two-dimensional area of the object 500. The expected two-dimensional area is generally a range of two-dimensional areas that are consistent with the various potential orientations of the object 500 in a human hand in space relative to the sensor plane. The approximated two-dimensional area can "match" the expected two-dimensional area if the approximated two-dimensional area is within the range defining the expected two-dimensional area.

Error signals can be communicated in a variety of ways, which has been described above. In examples, objects having an approximated two-dimensional area less than a threshold area will not result in the processor 704 providing an error signal. For example, if objects have an approximated two-dimensional area that is much smaller than the size of the target object from the target bin when positioned in a human hand, no error signal will be generated. In this manner, apparatuses, and methods according to embodiments can refrain from providing false alarms in the presence of debris, insects, or other small objects in the region adjacent the bin openings. Similarly, in some embodiments, objects with a relatively large approximated two-dimensional area will not cause the processor 704 to generate an error signal. Such a configuration may advantageously reduce inefficiencies associated with the system identifying, for example, a loading vehicle being present in the region adjacent the plurality of bin openings 101. In some embodiments the two-dimensional area approximation as described herein is implemented for the purpose of excluding data demonstrating an object location that does not match the target bin, such as if the object has an approximated two-dimensional area that is below a threshold (such as an insect or debris).

The sensor device 115 and triangulation processes as described above can be used to detect locations of objects 150 adjacent bin openings 101 using methods according to example embodiments. In some example embodiments, methods for using such apparatuses and triangulation can be used to identify that an incorrect bin was picked from either through identifying that an object having a size consistent with a human hand is located in a sub-region adjacent the opening of an incorrect bin, and/or identifying that a particular object in a hand has an approximate size that is inconsistent with the expected size of the target object from the target bin. In some other embodiments, the system is configured to identify an incorrect location of an object 150, whether the object is in the location through human error (i.e., removing an object from a non-target bin), or whether an object is otherwise unexpectedly in an incorrect location for any other reason.

Figure 4:
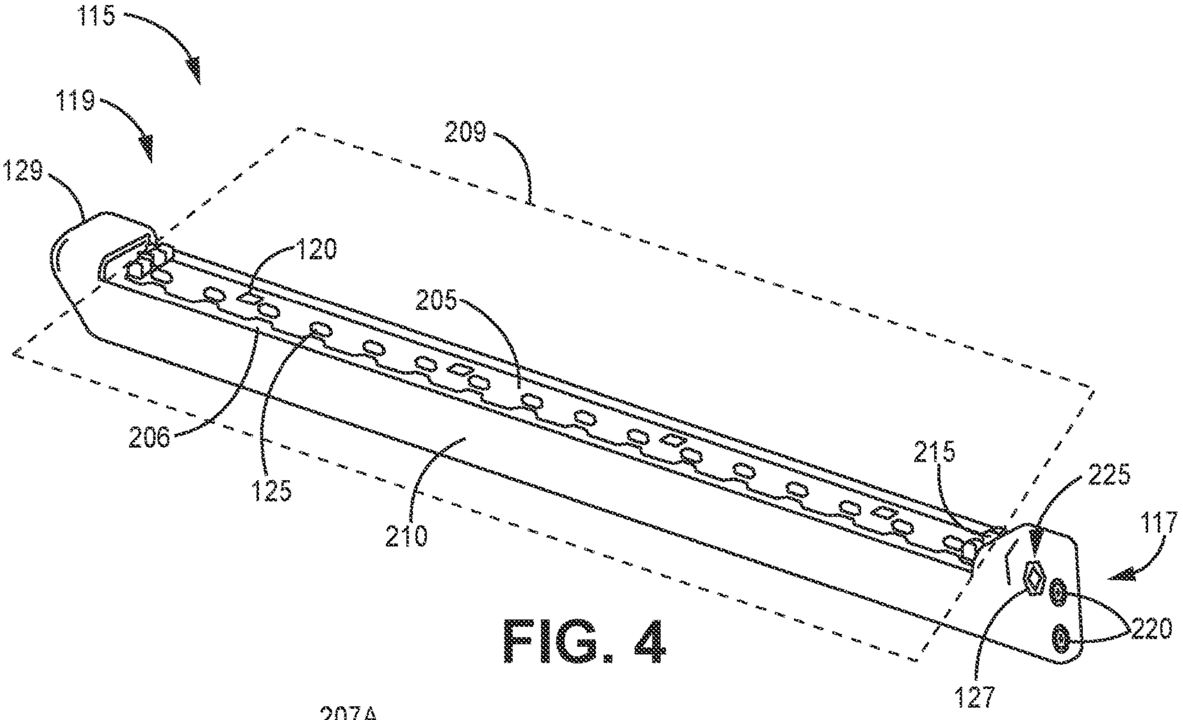
FIG. 4 depicts a perspective view of a sensing apparatus in accordance with example embodiments.
Figure 5A:
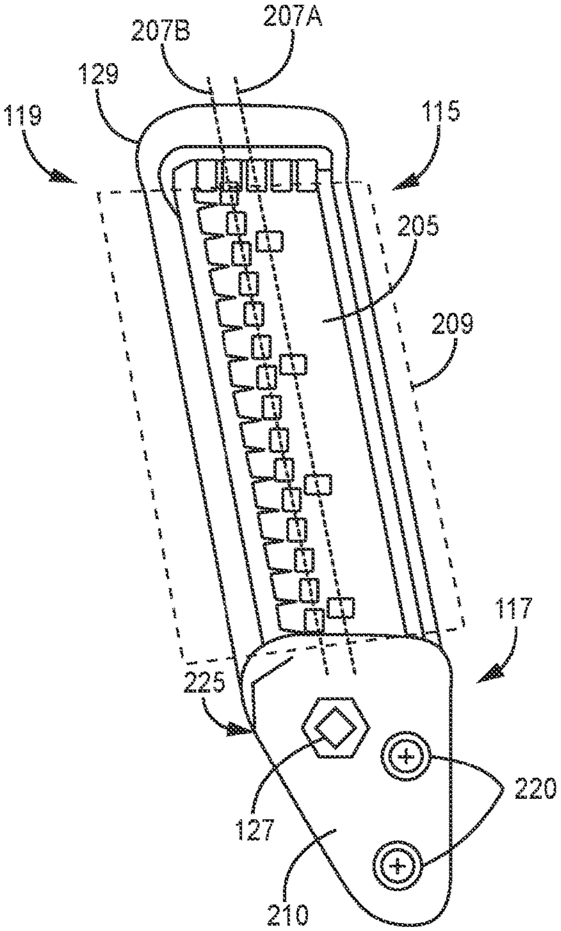
FIG. 5A depicts the sensing apparatus of FIG. 2 from an end perspective view.
Figure 5B:
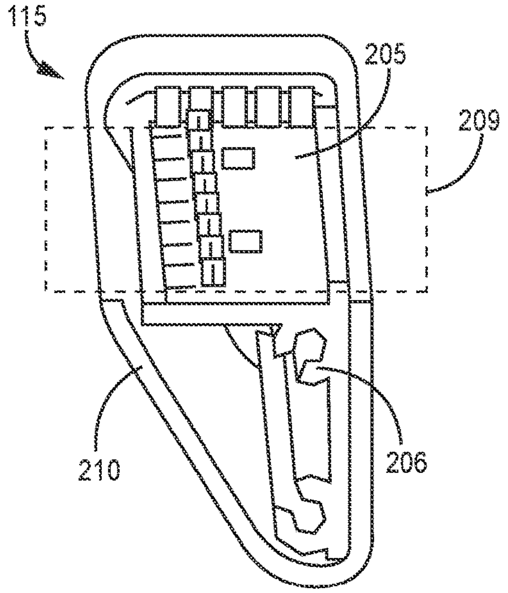
FIG. 5B depicts a cross-section view of the apparatus depicted in FIG. 5A.

FIG. 4 depicts a sensor device 115 in accordance with example embodiments. FIG. 5A depicts the sensor device 115 of FIG. 4 from an end perspective view. FIG. 5B depicts a cross-section view of the sensor device 115 depicted in FIG. 5A. While some sensor devices described above have been described in the context of a bin-pick system, this particular sensor device is not necessarily relevant to a bin pick system.

The sensor device 115 has an elongate frame 205. A plurality of distance sensors 120 are fixed to the elongate frame 205. In various embodiments the distance sensors 120 are equally spaced along the elongate frame 205. The plurality of distance sensors 120 define a sensor plane 209. Each of the distance sensors 120 is configured to sense an object distance outwardly from the sensor plane 209 according to algorithms described earlier herein. A processor 704 (FIGS. 1 and 6) can be in data communication with each of the plurality of distance sensors 120. The processor 704 can triangulate a location of a first object outwardly from the sensor plane 209 based on the object distance sensed by the plurality of distance sensors 120.

In some embodiments, a plurality of illumination elements 125 are arranged in an array along the elongate frame 205. In the depicted embodiment, the distance sensors 120 are disposed along a first axis 207A. The illumination elements 125 are disposed along a second axis 207B. As depicted, the first axis 207A and the second axis 207B are parallel to each other. In some embodiments, the first axis 207A and the second axis 207B are colinear. The illumination elements 125 are configured to selectively illuminate a beam of light outwardly from the sensor plane 209. As mentioned earlier herein, a bin identifier and/or a notification device can be in communication with the plurality of illumination elements 125.

Additional circuit elements 215 are disposed on the elongate frame 205. Some of these elements can include compute circuitry or communication circuitry as described later herein with respect to FIG. 7. The elongate frame 205 is disposed on a mounting structure 206 (FIG. 5B). The mounting structure 206 may, for example, be a linear extrusion. The linear extrusion may, for example, be aluminum and may advantageously function as a heat sink to transfer heat from the distance sensors 120, illumination elements 125, elongate frame 205, adjacent heat sources, other associated elements, or some combination thereof.

In the depicted embodiment, the mounting structure 206 is disposed within a housing 210. The sensor device 115 has a first elongate end 117 and an opposite, second elongate end 119 each having structural coupling elements 220 and an electrical and mechanical coupling interface 225. The depicted pair of structural coupling elements 220 on each elongate end 117, 119 may, by way of example and not limitation, be screws, rivets, adhesive point, weld point (e.g., plastic welding), other appropriate fastener, or some combination thereof. The structural coupling elements 220 may, for example, couple the housing 210 to the mounting structure 206.

The electrical and mechanical coupling interface 225 of the sensor device 115 can include a releasable electrical interface 127 towards the first elongate end 117 and a mating electrical interface 129 towards the second elongate end 119. The releasable electrical interface 127 and the mating electrical interface 129 have mating structures, whereby the releasable electrical interface 127 and the mating electrical interface 129 have a structure that would allow electrical and physical coupling. Although practically speaking, the releasable electrical interface 127 and the mating electrical interface 129 cannot be coupled due to the relative rigidity of the device, such a configuration allows one or more identical sensor devices to be coupled to the sensor device 115 depicted in a modular fashion to adapt the length of the device to systems having various lengths (within electrical load constraints).

In examples, either the releasable electrical interface 127 and/or the mating electrical interface 129 are configured to releasably couple to an electrical coupling element that establishes electrical communication between a power source and the distance sensors 120, the processor and other components of the sensor device 115 such as the illumination elements 125, if included. The electrical coupler may, for example, be a commercially available electrical coupler. In various embodiments, as mentioned above, multiple sensor devices 115 may be connected in series (e.g., "daisy-chained").

In various embodiments, the sensor device 115 may, by way of example and not limitation, be available in predetermined lengths, and/or configurations. A single sensor device 115 is configured to be coupled to various types of systems, where the sensors are in a position facing the area to be monitored. Accordingly, the sensor device 115 can be coupled to a system adjacent to openings of columns of shelves, bins, or the like. In some implementations that have been described herein, the sensor device 115 is configured to extend along a plurality of columns of shelf/bin openings to monitor the objects being removed from the shelves/bins.

Figure 6:
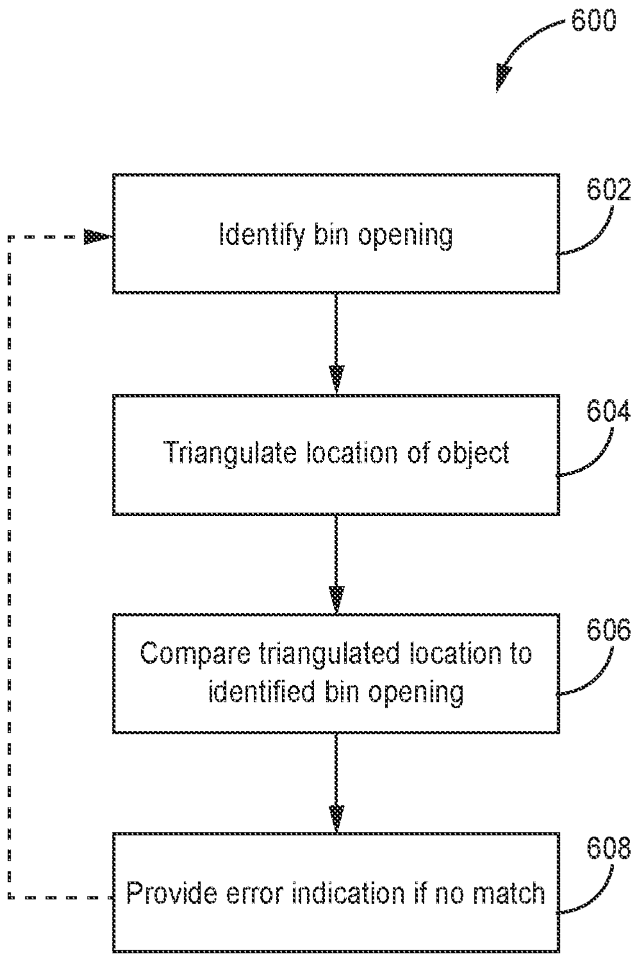
FIG. 6 illustrates a method for detecting incorrect location in accordance with example embodiments.
Figure 7:
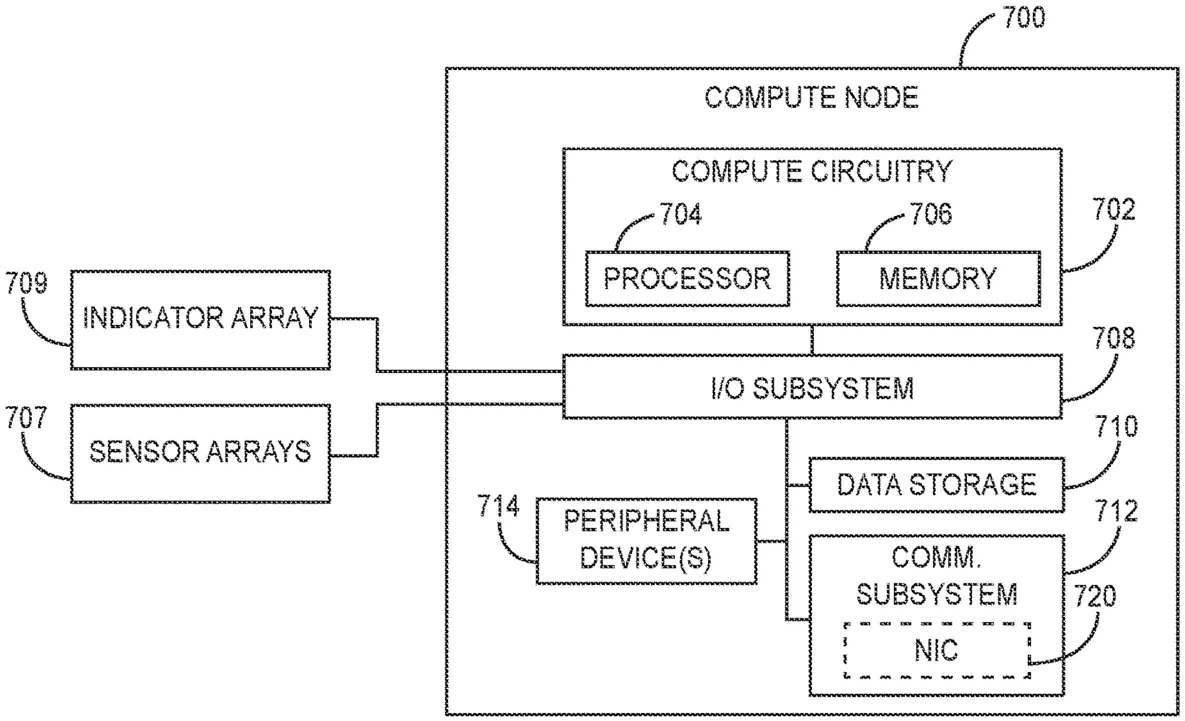
FIG. 7 provides an overview of example computing components at a compute node, which can be consistent with example embodiments.

FIG. 6 illustrates a method 600 for detecting incorrect location in accordance with example embodiments. Operations of the method 600 can be performed by the sensor device 115 (FIG. 1), processor 704 (FIG. 7), and/or other components of a compute node 700 (FIG. 7).

Method 600 can begin at operation 602 with identifying a first target bin opening of a plurality of bin openings arranged in a plurality of columns of bin openings. The identifying can include identifying a first column of bin openings of the plurality of columns of bin openings by the illumination elements of the sensor device selectively illuminating a first beam of light towards the first column of bin openings. The identifying can further include identifying the first target bin opening within the first column of bin openings. In some embodiments, such as where the bin openings are arranged in rows, identifying the first target bin opening can include identifying a first row of bin openings of a plurality of rows of bin openings. The identifying can include providing audio or visual identification, for example colored lighting, as described above.

Method 600 can continue with operation with the processor triangulating a location of a first object 604 adjacent the plurality of bin openings. The triangulation can be performed subsequently to identifying the first target bin opening. Triangulation can be performed in a manner similar to that described above.

Method 600 can continue with operation 606 with the processor comparing the triangulated location of the first object to the first target bin opening. The processor is configured to identify whether the first object is in a location consistent with the object having been removed from the target bin. Particularly, the processor is configured to identify a particular sub-region within which the first object is located, where the sub-region is within the region adjacent the plurality of columns of bin openings. The identified sub-region matches a first particular bin opening of the plurality of columns of bin openings, and that first particular bin opening is compared to the first target bin opening.

Method 600 can continue with operation 608 with the processor providing an error signal responsive to determining that the triangulated location of the first object does not match the first target bin opening. The first object location does not match, for example, when a first particular sub-region (correlating with a particular bin opening) within which the object is located is inconsistent with a first target sub-region correlating with the first target bin opening.

Additionally or alternatively, in the event that the location of the first object does match the first target bin opening, additional bin openings can be identified for bin pick operations according to method 600 by repeating steps described above. Accordingly, the method 600 can include identifying at least a second target bin opening 602. Identifying the second target bin opening can include selectively illuminating a beam of light toward a second column of bin openings. Identifying the second target bin opening can also include identifying a second row of bin openings of a plurality of rows of bin openings, in configurations where the bin openings are also arranged in rows. In examples, the second target bin opening is different than the first target bin opening. After identifying the second target bin opening, a second object location can be triangulated 604 adjacent the plurality of bin openings similarly to as described above. The method 600 can further include comparing the triangulated location of the second object to the second target bin opening 606 and provide an error signal 608 when the triangulated location of the second object does not match the second target bin opening.

Computing Systems

In further examples, any of the compute nodes or devices discussed with reference to the present computing systems and environment may be fulfilled based on the components depicted in FIG. 7. Respective compute nodes may be embodied as a type of device, appliance, computer, apparatus or controller of a computerized apparatus, or other apparatus capable of communicating with other edge, networking, or endpoint components. For example, a compute device may be embodied as a personal computer, server, smartphone, a mobile compute device, a smart appliance, a self-contained device having an outer case, shell, etc., a sensor device 115 (FIG. 1) or component thereof, or other device or system capable of performing the described functions.

In the simplified example depicted in FIG. 7, a compute node 700 includes a compute engine (also referred to herein as "compute circuitry") 702, an input/output (I/O) subsystem 708, data storage device 710, communication circuitry 712, and, optionally, one or more peripheral devices 714. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component.

The compute node 700 may be embodied as any type of engine, device, or collection of devices capable of performing various compute functions. In some examples, the compute node 700 may be embodied as a single device such as an integrated circuit, an embedded system, a field-programmable gate array (FPGA), a system-on-a-chip (SOC), or other integrated system or device. In the illustrative example, the compute node 700 includes or is embodied as a processor 704 and a memory 706. The processor 704 may be embodied as any type of processor capable of performing the functions described herein (e.g., executing an application). For example, the processor 704 may be embodied as a multi-core processor(s), a microcontroller, or other processor or processing/controlling circuit. In some examples, the processor 704 may be embodied as, include, or be coupled to an FPGA, an application specific integrated circuit (ASIC), reconfigurable hardware or hardware circuitry, or other specialized hardware to facilitate performance of the functions described herein.

The memory 706 may be embodied as any type of volatile (e.g., dynamic random-access memory (DRAM), etc.) or non-volatile memory or data storage capable of performing the functions described herein. Volatile memory may be a storage medium that requires power to maintain the state of data stored by the medium. Non-limiting examples of volatile memory may include various types of random-access memory (RAM), such as DRAM or static random-access memory (SRAM). One particular type of DRAM that may be used in a memory module is synchronous dynamic random-access memory (SDRAM).

In an example, the memory 706 is a block addressable memory device, such as those based on NAND or NOR technologies. The memory device may refer to the die itself and/or to a packaged memory product. In some examples, all or a portion of the memory 706 may be integrated into the processor 704. The memory 706 may store various software and data used during operation such as one or more applications, data operated on by the application(s), libraries, and drivers.

The compute circuitry 702 is communicatively coupled to other components of the compute node 700 via the I/O subsystem 708, which may be embodied as circuitry and/or components to facilitate input/output operations with the compute circuitry 702 (e.g., with the processor 704 and/or the main memory 706) and other components of the compute circuitry 702. For example, the I/O subsystem 708 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 708 may form a portion of a system-on-a-chip (SoC) and be incorporated, along with one or more of the processor 704, the memory 706, and other components of the compute circuitry 702, into the compute circuitry 702.

The I/O subsystem 708 can take inputs from, among other devices and apparatuses, the distance sensors in the sensor array(s) 707 that are incorporated as part of the sensor device 115 (FIG. 1). The processor 704 may then, for example, operate an associated set of indicators in the indicator array(s) 709 according, for example, to a predetermined visual indication event. For example, the processor 704 may operate the indicators, by way of example and not limitation, to turn off illumination elements, blink illumination elements, change colors of illumination elements, generate an audio signal, generate a display code, or some combination thereof. The visual indication event may, for example, advantageously acknowledge that the operator picked the parts from that bin (or put the parts to the bin).

In various embodiments, an indicator array(s) 709 may be configured, for example, to indicate to the operator how many parts to select from a bin. For example, the processor 704 may operate one or more of the indicators in the array 709 to illuminate which bin to select from with one color of visual indicia, and to use another color of visual indicia to signify how many parts to pick. The processor 704 may, for example, indicate a pick (or put) count, for example, by short flashing bursts.

The one or more illustrative data storage devices 710 may be embodied as any type of devices configured for short-term or long-term storage of data such as, for example, memory devices and circuits, memory cards, hard disk drives, solid-state drives, or other data storage devices. Individual data storage devices 710 may include a system partition that stores data and firmware code for the data storage device 710. Individual data storage devices 710 may also include one or more operating system partitions that store data files and executables for operating systems depending on, for example, the type of compute node 700.

The communication circuitry 712 may be embodied as any communication circuit, device, or collection thereof, capable of enabling communications over a network between the compute circuitry 702 and another compute device (e.g., an edge gateway of an implementing edge computing system). The communication circuitry 712 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, a IoT protocol such as IEEE 802.15.4 or ZigBee®, low-power wide-area network (LPWAN) or low-power wide-area (LPWA) protocols, etc.) to effect such communication.

The illustrative communication circuitry 712 includes a network interface controller (NIC) 720. The NIC 720 may be embodied as one or more add-in-boards, daughter cards, network interface cards, controller chips, chipsets, or other devices that may be used by the compute node 700 to connect with another compute device. In some examples, the NIC 720 may be embodied as part of a system-on-a-chip (SoC) that includes one or more processors or included on a multichip package that also contains one or more processors. In some examples, the NIC 720 may include a local processor (not shown) and/or a local memory (not shown) that are both local to the NIC 720. In such examples, the local processor of the NIC 720 may be capable of performing one or more of the functions of the compute circuitry 702 described herein. Additionally, or alternatively, in such examples, the local memory of the NIC 720 may be integrated into one or more components of the client compute node at the board level, socket level, chip level, and/or other levels.

Additionally, in some examples, a respective compute node 700 may include one or more peripheral devices 714. Such peripheral devices 714 may include any type of peripheral device found in a compute device or server such as audio input devices (e.g., speakers), a display, other input/output devices, interface devices, and/or other peripheral devices, depending on the compute node 700. In further examples, the compute node 700 may be embodied by a respective edge compute node (whether a client, gateway, or aggregation node) in an edge computing system or like forms of appliances, computers, subsystems, circuitry, or other components.

Instructions for implementing any of the methods described herein can be stored on a machine-readable medium. The machine-readable medium can include any tangible medium that is capable of storing, encoding, or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of several transfer protocols (e.g., Hypertext Transfer Protocol (HTTP)).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically, or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

This application is intended to cover adaptations or variations of the present subject matter. It is to be understood that the above description is intended to be illustrative, and not restrictive, and the claims are not limited to the illustrative embodiments as set forth herein.

What is claimed is:

1. A sensor device comprising:

an elongate frame;

a plurality of distance sensors equally spaced and fixed to the elongate frame, the plurality of distance sensors each having a sensor face, wherein the sensor faces cumulatively define a sensor plane, wherein each of the plurality of distance sensors is configured to sense an object distance outwardly from the sensor plane; and a processor in data communication with each of the plurality of distance sensors, wherein the processor is configured to triangulate a location of an object outwardly from the sensor plane, wherein the processor is configured to approximate a size of a two-dimensional area of the object in an object plane parallel to the sensor plane, receive an expected size of the two-dimensional area of the object based on the triangulated location, compare the approximate size of the two-dimensional area to the expected size of the two-dimensional area, and generate an error signal when the approximated size of the two-dimensional area does not match the expected size of the two-dimensional area of the object.

2. The device of claim 1, further comprising a notification device, wherein the processor is in operative communication with the notification device.

3. The device of claim 2, the notification device comprising:

a plurality of illumination elements arranged along the elongate frame, where each of the plurality of illumination elements are configured to selectively illuminate a beam of light outwardly from the frame, wherein the processor is configured to selectively illuminate an individual illumination element of the plurality of illumination elements.

4. The device of claim 3, wherein each of the plurality of illumination elements comprises a multi-color light emitting diode.

5. The device of claim 3, wherein each of the plurality of illumination elements comprises a plurality of light emitting diodes.

6. The device of claim 5, wherein each of the plurality of illumination elements comprises a light emitting diode having a first color and a light emitting diode having a second color.

7. The device of claim 1, further comprising a releasable electrical interface towards a first elongate end of the sensor device and a mating electrical interface towards an opposite elongate end of the sensor device, wherein the releasable electrical interface and the mating electrical interface have structures capable of mating.

8. The sensor device according to claim 1, wherein the triangulated location is adjacent to an opening of a bin, and wherein the expected size of the two-dimensional area of the object is based on the expected size of an expected object associated with the bin.

9. The sensor device according to claim 1, wherein the triangulated location is adjacent to an opening of a bin, and wherein the expected size of the two-dimensional area of the object is an expected size of a human hand and an expected object associated with the bin.

* * * * *